| United States Patent | [11] 3,596,469 |

| [72] | Inventors | Einosuke Higashimura;<br>Shunsuke Tazawa; Eiichi Nakamura, all of Tokyo, Japan |
| --- | --- | --- |
| [21] | Appl. No. | 781,299 |
| [22] | Filed | Nov. 29, 1968 |
| [45] | Patented | Aug. 3, 1971 |
| [73] | Assignees | Mitsubishi Rayon Co., Ltd.<br>Tokyo, Japan;<br>Nitto Chemical Industry Co., Ltd.<br>Tokyo, Japan |
| [32] | Priority | Nov. 30, 1967 |
| [33] | | Japan |
| [31] | | 42/76419 |

[54] PROCESS FOR THE STABILIZATION OF SOIL
13 Claims, No Drawings

[52] U.S. Cl. .................................................... 61/36
[51] Int. Cl. ..................................................... E02d 3/12
[50] Field of Search.......................................... 61/36;
166/295; 47/58; 260/29.6 TA, 29.6 H, 29.6 HN

[56] References Cited
UNITED STATES PATENTS

| 2,801,984 | 8/1957 | Morgan et al. | 166/295 X |
| 2,865,177 | 12/1958 | Gnaedinger | 61/36 |
| 3,021,298 | 2/1962 | Rakowitz | 61/36 X |
| 3,210,310 | 10/1965 | Holbert et al. | 260/29.7 |
| 3,212,577 | 10/1965 | Holbert et al. | 166/295 |
| 3,247,900 | 4/1966 | Perry et al. | 166/295 X |

Primary Examiner—Stephen J. Novosad
Attorney—Cushman, Darby & Cushman

ABSTRACT: In the stabilization of soil by injecting into the soil a mixture comprising a water-soluble divinyl compound, a water-soluble vinyl compound and a redox catalyst, a mixture of an amine and a reducing metal complex is used as the reducing component of the redox catalyst, whereby the soil can be made particularly great in strength in a short period of time.

PROCESS FOR THE STABILIZATION OF SOIL

This invention relates to a process for the stabilization of soil.

In the fields of civil engineering, construction and mining, it is of great importance to make soft and weak soil strong thereby facilitating the subsequent works, and to carry out the grouting of soil to prevent underground water from gushing during tunneling or underground works. For the above purpose, there has heretofore been adopted a grouting method in which such material as cement milk, water glass or chromium lignin is injected into soil. These materials, however, have such drawbacks that they cannot be freely controlled in solidification time, and cannot penetrate into soil having fine interstices, because of their high viscosity.

In view of the above, there has been developed a method using a chemical grout, which can freely penetrate into soil having fine interstices and is freely controllable in solidification time. According to said method, soil is stabilized in such a manner that a chemical grout, which is an aqueous solution containing acrylamide, acrylate or other water-soluble vinyl compound and a cross-linking agent, and a polymerization catalyst are injected into soil, to form a water-insoluble and water-impermeable polymer-soil mass (= gel).

For the polymerization of said chemical grout in soil, there may be adopted an ordinary radical polymerization procedure using ammonium persulfate, potassium persulfate or hydrogen peroxide. However, when said compounds are used alone, a long time is required for the solidification. In order to quickly effect said polymerization at low temperatures, it is effective to use the so-called redox catalysts prepared by combining said oxidizing agents with reducing materials. Procedures using such redox catalysts have been adopted, in general. For use in said redox catalysts, a tertiary amine such as, for example, dimethylaminopropionitrile, nitrilotrispropionamide, triethanolamine, dimethylaminoethanol or N,N,N',N'-tetramethylethylenediamine, is a considerably excellent reducing agent in its activity and easiness in control of solidification time. However, the catalyst activity of such tertiary amine is not sufficient in the case where a very short solidification time is required at low temperature. In the case that to obtain a short solidification time, the amine should be used in such an extremely large amount as being substantially equal to an amount of the polymerizable components. This is not only undesirable from the economical standpoint but also greatly lowers the strength of the resulting gel (polymer-soil mass). Moreover, an offensive odor derived from the use of amine in large amount brings about great drawbacks from the standpoint of works, since the works are mostly effected in closed places like in the case of tunneling works or underground works.

Further, if, in the polymerization of the aforesaid chemical grout, a reducing metal ion such as a divalent iron ion is used as the reducing component of the redox catalyst, no solidification progresses unless the amount of the metal ion has reached a definite effective amount. When the amount thereof has reached an effective amount, a part of the chemical grout rapidly solidifies, but the remaining part slowly solidifies, and it is difficult to obtain a definite solidification time and a homogenous gel. Such a phenomenon is disadvantageous for the stabilization of soil and is quite undesirable in the case where water is desired to be prevented from spouting. That is, there is such a danger that the chemical grout would be flowed off due to water pressure prior to the solidification of the whole body.

The present inventors previously found the fact that when, in polymerizing in soil such a chemical grout as mentioned above, the combination of a tertiary amine and a reducing metal ion is used as a reducing component of the redox catalyst, the above-mentioned drawbacks of the two materials are overcome to provide excellent catalyst activity, and solidification can be effected relatively quickly even when the amount of tertiary amine is reduced. (U.S. Ser. No. 663,992 filed Aug. 29, 1967). In the case of a catalyst system containing such combination of amine and reducing metal ion, a considerably short solidification time can be attained when there is used, as the amine, not only the conventional tertiary amine but also such a secondary amine or polyamine as, for example, triethylenetetramine, diethanolamine, hexamethylenediamine, ethylenediamine or diethylenetriamine.

However, a drawback of a catalyst system containing such combination of amine and reducing metal ion is that the system becomes weakly basic due to the amine, and therefore a part of the reducing metal ion such as divalent iron ion comes to precipitate in the form of a hydroxide. When such precipitate has been formed, the precipitate is filtered at the fine interstices of soil, when the chemical grout solution is injected into the soil, and thus the amount of reducing metal ion is greatly decreased. Consequently, the solidification time becomes long, and there is such a fear that the addition of reducing metal ion is of no use.

Another drawback is that the strength of the resulting gel is more degraded, though slightly, than in the case where the amine has been only used as the reducing agent.

An object of the present invention is to provide a process for the quick stabilization of soil.

Another object is to provide a process for obtaining stabilized soil high in strength.

A further object is to provide a soil stabilization process in which is prevented the formation of a metal compound precipitate derived from the use of a catalyst system containing as a reducing component a combination of an amine and a reducing metal ion.

A still further object is to provide a soil stabilizer mixture which can penetrate into the fine interstices of soil and which can solidify quickly.

Other objects will become apparent from the following description.

The present invention is a process for the stabilization of soil in which an amine and a reducing metal complex which is water soluble and is stable under the basicity of amine, are used as a reducing component of a redox catalyst employed to solidify in soil a soil stabilizer comprising at least one water-soluble divinyl compound and at least one water soluble vinyl compound.

In accordance with the present invention, the formation of such a reducing metal ion precipitate as mentioned above is prevented, and a homogeneous chemical grout solution which is preferable to be polymerized in soil can be obtained. What is of surprise is that by use of the reducing metal complex, the solidification time of the soil stabilizer (chemical grout) in soil can be made far shorter than in the case where a reducing metal ion is used. Further, the strength of the resulting gel can be more increased than in the case where a large amount of amine or a combination of amine and reducing metal ion is used as the reducing component, of the redox catalyst.

All the divinyl compounds and vinyl compounds employed in the present process are required to be water soluble at concentrations when they are used.

Examples of the water soluble divinyl compounds are polyvalent salts of acrylic acid such as calcium acrylate, magnesium acrylate and zinc acrylate, polyvalent salts of methacrylic acid such as magnesium methacrylate, calcium methacrylate and strontium methacrylate, alkylidenebis acrylamides such as methylenebis acrylamide, glycerol diacrylate, 1,3-di-(acrylamidomethyl)-2-imidazolidone, and 1,3-di-(acrylamidomethyl)-2-imidazolidone. However, any other water soluble divinyl compounds may, of course, be used.

Examples of the water soluble vinyl compounds are acrylic acid and monovalent salts thereof, methacrylic acid and monovalent salts thereof, acrylamide, methacrylamide, N-methylolacrylamide, N-methylolmethacrylamide, and alkyl esters of acrylic and methacrylic acids such as hydroxyethyl acrylate, hydroxypropyl acrylate, hydroxyethyl methacrylate and dimethylaminoethyl methacrylate. These may, of course, be used as a mixture of the two or more.

As the amines, which are one of the reducing components of the redox catalysts employed, there are used tertiary amines such as B-dimethylaminopropionitrile, B-dimethylamineothanol, dimethylaminopropanol, nitrilotrispropionamide and triethanolamine, or secondary amines and polyamines such as triethylenetetramine, hexamethylenediamine and ethylenediamine. These may be used in admixture.

The amounts of these amines employed are variable depending on the desired solidification time and on the kinds of reducing metal complexes. Generally, however, the amines are preferably used in proportions of 0.001—20 percent by weight based on the total amount of the polymerizable components (divinyl compound and vinyl compound).

The reducing metal complexes used in the present process are required to be water soluble at concentrations employed. Since the concentrations employed are ordinarily 0.01—5 percent by weight, the use of complexes having a solubility of at least 0.01 percent is preferable. The complexes are also required to be stable under the basicity of amines. The wording "stable" referred to herein signifies such a degree that no precipitation of metal compounds takes place even when the amines are added to aqueous solution of the complexes. Examples of such complexes are those of reducing metal ions with an oxyacid such as tartaric, citric, malic or lactic acid; with succinic or oxalic acid, with nitrilotriacetic acid or a water-soluble salt thereof; with ammonium oxalate; with acetylacetone; and with ethylenediaminetetraacetic acid or a water-soluble salt thereof. These complexes may be used in admixture.

Among the above-mentioned complexes, those comprising reducing metal ions and tartaric or citric acid are most preferable in view of their catalyst effects and their stabilities under basicity of amine. Complexes which are preferable next to the above complexes are those comprising reducing metal ions and nitrilotriacetic acid or water soluble salts thereof.

In the present process, an aqueous complex solution formed by adding a complexing agent to an aqueous solution containing a reducing metal ion may be used as it is. According to the present invention, therefore, soil can be stabilized by adding to an aqueous solution containing a soil stabilizer, an amine and a reducing metal ion, a complexing agent capable of forming a stable complex with said metal ion under basicity of the amine, thereby converting said metal ion to a complex, and injecting the aqueous solution into soil together with an aqueous solution containing an oxidizing component, and thus solidifying said aqueous solution. Generally, a metal complex is formed immediately by contacting a metal ion with a complexing agent. For the actual stabilization of soil, therefore, there is frequently adopted a process in which a complexing agent is added to an aqueous soil stabilizer solution containing a reducing metal ion.

As the reducing metal ion, there may be used, for example, Fe(II), Sn(II), Mn(II), Cu(II), Zn(II), Ni(II), Pb(II), Ag(I) or Co(II) ion. Particularly, the use of Fe(II) ion is preferable.

As the complexing agent capable of forming a stable complex with the reducing metal ion under the basicity of amine, there may be used an oxyacid such as tartaric, citric, malic or lactic acid, succinic acid, oxalic acid, ammonium oxalate, acetylacetone, nitrilotriacetic acid or its water-soluble salt, or ethylenediaminetetraacetic acid or its water soluble salt.

The amount of reducing metal complex employed is preferably from about 0.02 to about 30 percent by weight based on the weight of the polymerizable components. This amount of said complex may be obtained by use of, based on the weight of the polymerization component, about 0.01 to 20 percent by weight of a reducing metal ion and about 0.01 to 20 percent by weight of a complexing agent.

In the present invention, it is preferable to adopt the soil stabilization procedure carried out by injecting into soil a mixed aqueous solution prepared by mixing an aqueous soil stabilizer solution containing an amine, a reducing metal ion and a complexing agent with an aqueous solution containing an oxidizing agent. In this case, the concentration of the soil stabilizer contained in the aqueous solution is ordinarily about 2—10 percent by weight. If stabilized soil greater in strength is desired, it is possible to make the concentration higher.

As the oxidizing agent of the redox catalyst, there may be used any of those which are ordinarily employed in redox catalysts, such as ammonium persulfate, potassium persulfate or the like. The amount of oxidizing agent employed is preferably from 0.1 to 1.5 percent by weight based on the mixed aqueous solution. The total amount of the reducing metal ion and the complexing agent contained in said mixed aqueous solution is ordinarily from 0.01 to 5 percent by weight.

In the case where soil is stabilized in accordance with the present process by injecting into the soil a mixture comprising the aforesaid water-soluble divinyl compound, water-soluble vinyl compound and redox catalyst and solidifying the mixture in the soil according to redox polymerization, there are obtained the following effects:

i. The scope of amines usable as reducing components of redox catalysts can be broadened from tertiary amines to secondary amines and polyamines.

ii. Such drawbacks of reducing metal ions as mentioned above can be overcome.

iii. A markedly short solidification time can be attained.

iv. The amount of amine employed can be decreased to solve the economical problem as well as the lowering in efficiency of works due to offensive odor derived from the amine.

v. It is possible to obtain soil greater in strength than in the case where a mixture of amine and reducing metal ion is used.

It may therefore be said that the present process is an extremely advantageous process for the stabilization of soil.

The present invention will be illustrated in detail below with reference to examples, but the technical scope of the invention is not limited by the examples. In the examples, all the parts are by weight.

Example 1

Ten parts of an aqueous solution containing 0.4 part of dimethylaminopropionitrile and 10 parts of an aqueous solution containing 0.025 part of ferrous sulfate and 0.025 part of tartaric acid were added to 40 parts of an aqueous solution containing as polymerizable components 3.0 parts of acrylic acid amide, 0.15 part of sodium acrylate, 0.5 part of magnesium methacrylate and 0.48 part of 1,3-di-(acrylamidomethyl)-2-imidazolidone. The resulting mixed aqueous solution was homogeneous, and no formation of precipitate was observed therein at all. This aqueous solution was charged with 0.5 part of ammonium persulfate and was further diluted with water to make 100 parts. In this case also, no formation of precipitate was observed at all. One hundred parts of the thus diluted aqueous solution was mixed with 300 parts of standard sand of Toyoura origin. Subsequently, the mixture was allowed to stand in air at 10° C., whereby the mixture solidified after 1 minute and 10 seconds to form a water-impermeable, water insoluble, tough sand gel. The monoaxial compression strength of this sand gel after 2 hours was 6.0 kg./cm.$^2$.

For comparison, a mixed aqueous solution was prepared in the same manner as above, except that no tartaric acid was used. In this case, the mixed aqueous solution formed a precipitate of iron hydroxide. This precipitate was removed by filtration, and the filtrate was used for the solidification of sand. In this case, the solidification time was 2—4 minutes, and an unhomogeneous sand gel was formed. The unhomogeneous sand gel referred to herein signifies that the sand gel is not uniform in strength. The monoaxial compression strength of the sand gel after 2 hours was 5.2 kg./cm.$^2$.

In the above case, the mixed aqueous solution was used after removing the filtrate by filtration for such reason that in the stabilization of soil, in general, such precipitate is filtered in the soil and only the filtrate takes part in the stabilization of soil due to solidification, and therefore said mixed aqueous solution was brought into a state coinciding with the aforesaid condition.

Example 2

One hundred parts of a mixed aqueous solution containing 2.7 parts of acrylamide, 0.14 part of sodium acrylate, 0.37 part of sodium methacrylate and 0.45 part of 1,3-di-(acrylamidomethyl)-2-imidazolidone as polymerizable components, and further containing a mixture of 0.5 part of ammonium persulfate, 0.6 part of dimethylaminopropionitrile and 0.025 part of ferrous sulfate as a redox catalyst, and 0.025 part of tartaric acid as a complexing agent was mixed 300 parts of standard sand of Toyoura origin. Subsequently, the mixture was allowed to stand in air at 10° C., whereby it solidified after 1 and 15 seconds to form a water-impermeable, water-insoluble, tough sand gel. The monoaxial compression strength of the sand gel after 2 hours was 5 kg./cm.$^2$.

For comparison, the same polymerizable components and redox catalyst as above were used, except the use of tartaric acid. This mixed aqueous solution formed a precipitate of iron hydroxide. The precipitate was removed by filtration and the filtrate was used for the solidification of sand. In this case, the solidification time was 2—4 minutes and an unhomogeneous gel was formed. The monoaxial compression strength of this gel after 2 hours was 4.6 kg./cm.$^2$.

Examples 3—16.

Using mixed aqueous solutions containing the polymerizable components, redox catalysts and complexing agents shown in table 1, the stabilization of sand of Toyoura origin was effected to obtain sand gels which were water impermeable, water insoluble and tough. The solidification time and monoaxial compression strength of the sand gel after 2 hours are shown in table 1 in comparison with those measured in the cases of mixed aqueous solutions containing no complexing agent (a precipitate was formed in every case).

Example 17

One hundred parts of a mixed aqueous solution containing 5.25 parts of acrylamide and 0.48 part of 1,3-di-(acrylamidoethyl)-2-imidazolidone as polymerizable components, and further containing a mixture of 0.5 part of ammonium persulfate, 0.6 part of triethanolamine and 0.025 part of ferrous sulfate as a redox catalyst, and 0.025 part of citric acid as a complexing agent was mixed with 300 parts of standard sand of Toyoura origin. Subsequently, the mixture was allowed to stand in air at 10° C., whereby it solidified after 20 seconds to form a water impermeable, water insoluble, tough

TABLE 1

| Example | Polymerizable components (part) | Redox catalyst (part) | Complexing agent (part) | Soil employed (part) |
|---|---|---|---|---|
| 3 | Acrylamide (2.7); Sodium acrylate (0.2); Sodium methacrylate (0.37); 1,3-di-(acrylamidomethyl)-2-imidazolidone (0.45). | Ammonium persulfate 0.5; Dimethylaminopropionitrile 0.6; Ferrous sulfate 0.03. | Disodium ethylenediamine tetraacetic acid (0.025). | Standard sand of Toyoura origin (300). |
| 4 | Acrylamide (2.7); Sodium methacrylate (0.37); 1,3-di-(acrylamidomethyl)-2-imidazolidone (0.45). | ...do... | Acetylacetone (0.025) | ...do... |
| 5 | Acrylamide (2.7); Sodium acrylate (0.14); Sodium methacrylate (0.37); 1,3-di-(acrylamidomethyl)-2-imidazolidone (0.45). | ...do... | Nitrilotriacetic acid (0.025) | ...do... |
| 6 | Acrylamide (2); Sodium acrylate (0.1); Sodium methacrylate (0.25); Methylol acrylamide (0.25); 1,3-di-(acrylamidomethyl)-2-imidazolidone (0.45). | ...do... | Tartaric acid (0.025) | ...do... |
| 7 | Acrylamide (1.5); Sodium acrylate (0.065); Sodium methacrylate (0.25); Methylol acrylamide (1.0); 1,3-di-(acrylamidomethyl)-2-imidazolidone (0.5). | ...do... | ...do... | ...do... |
| 8 | Acrylamide (1.5); Sodium acrylate (0.065); Methylol acrylamide (1.0); 1,3-di-(acrylamidomethyl)-2-imidazolidone (0.5). | ...do... | ...do... | ...do... |
| 9 | Acrylamide (1.5); Sodium acrylate (0.065); Methylol acrylamide (1.5); 1,3-di-(acrylamidomethyl)-2-imidazolidone (0.5). | ...do... | ...do... | ...do... |
| 10 | Acrylamide (5.52); 1,3-di-(acrylamidomethyl)-2-imidazolidone (0.48). | Ammonium persulfate (0.5); Dimethylaminopropionitrile (0.6); Ferrous sulfate (0.025). | Citric acid (0.025) | ...do... |
| 11 | ...do... | ...do... | Ammonium oxalate (0.025) | ...do... |
| 12 | Acrylamide (6.9); 1,3-di-(acrylamidomethyl)-2-imidazolidone (0.6). | Ammonium persulfate (0.5); Dimethylaminopropionitrile (0.6); Stannous chloride (0.5). | Citric acid (0.5) | ...do... |
| 13 | Acrylamide (9.2); 1,3-di-(acrylamidomethyl)-2-imidazolidone (0.8). | Ammonium persulfate (0.5); Dimethylaminopropionitrile (0.5); Stannous chloride (0.5). | Nitrilotriacetic acid (0.5) | ...do... |
| 14 | ...do... | Ammonium persulfate (0.5); Dimethylaminopropionitrile (0.5); Silver nitrate (0.5). | Acetylacetone (0.5) | ...do... |
| 15 | ...do... | Ammonium persulfate (0.5); Dimethylaminopropionitrile (0.5); Lead nitrate (0.5). | ...do... | ...do... |
| 16 | ...do... | Ammonium persulfate (0.5); Dimethylaminopersulfate (0.5); Manganese sulfate (0.5). | ...do... | ...do... |

| Example | Allowed-to-stand temperature (° C.) | Solidification time | Monoaxial compression strength after 2 hours (kg./cm.$^2$) | Comparison Solidification time | Comparison State of gel | Monoaxial compression strength after 2 hours (kg./cm.$^2$) |
|---|---|---|---|---|---|---|
| 3 | 10 | 1 min. 16 sec | 4.8 | 2—4 min | Unhomogeneous gel was formed | 4.4 |
| 4 | 10 | 1 min. 15 sec | 4.7 | ...do... | ...do... | 4.2 |
| 5 | 10 | 1 min. 16 sec | 4.0 | ...do... | ...do... | 4.5 |
| 6 | 10 | 1 min. 30 sec | 3.8 | ...do... | ...do... | 3.3 |
| 7 | 2 | 1 min. 20 sec | 3.7 | 2 min. 10 sec. ~7 min. 30 sec | ...do... | 3.3 |
| 8 | 2 | 36 sec | 3.0 | 1 min. 36 sec. ~6 min. 30 sec | ...do... | 3.4 |
| 9 | 2 | 22 sec | 3.3 | 1 min. 27 sec. ~5 min. 54 sec | ...do... | 2.6 |
| 10 | 10 | ...do... | 6 | 1 min. 30 sec. ~3 min. 30 sec | ...do... | 2.8 |
| 11 | 10 | 1 min. 7 sec | 6 | 1 min. 30 sec. ~30 min. 30 sec | ...do... | 5.2 |
| 12 | 10 | 1 min. 30 sec | 7.2 | 1 min. 30 sec | ...do... | 5.5 |
| 13 | 10 | 15 sec | 8 | 9 min. ~30 min | ...do... | 6.5 |
| 14 | 10 | 31 sec | 8 | 1 min. 10 sec | ...do... | 7.2 |
| 15 | 10 | 2 min. 13 sec | 8 | >30 min | No sand gel formation was observed after 30 minutes. | 7.2 |
| 16 | 10 | 3 min. 20 sec | 8 | 6 min | Unhomogeneous gel was formed | 7.2 | sand gel. The monoaxial compression strength of the sand gel after 2 hours was 5 kg./cm.²

For comparison, the same polymerizable components and redox catalyst as above were used, except the use of citric acid, to prepare a mixed aqueous solution. In this case, a solidification time of from 1 minute and 20 seconds to 3 minutes and 32 seconds was required, and an unhomogeneous gel was formed.

Example 18

The same procedures as in example 17 were repeated, except that each 0.6 part of various reducing amines were used in place of the triethanolamine, to prepare mixed aqueous solutions. Solidification times required by use of the mixed aqueous solutions are set forth in table 2 in comparison with those required in the case of mixed aqueous solutions prepared in the same manner as above except the use of citric acid.

TABLE 2.

| Amines | Solidification time | |
|---|---|---|
| | Citric acid added | No citric acid added |
| Diethylamino ethanol | 38 sec. | 50 sec.-1 min. 50 sec. |
| N,N,N',N'-tetraethylene-tetramine | 15 sec. | 30-40 sec. |
| Triethylenetetramine | 20 sec. | 40 sec.-7 min. 45 sec. |
| Morpholine | 27 sec. | 2 min. 12 sec.-6 min. 5 sec. |

We claim:

1. A process for the stabilization of soil which comprises injecting into the soil a mixture comprising at least one water-soluble divinyl compound, at least one water-soluble vinyl compound copolymerizable therewith, and a redox catalyst, and polymerizing and solidifying the mixture in the soil, characterized by using as the reducing component of the redox catalyst a catalytic amount of a mixture of an amine in amount of 0.001—20 percent and 0.02—20 percent by weight of a reducing metal complex based on the polymeric compound, said complex being eater soluble and stable under the basicity of the amine.

2. A process according to claim 1, wherein the reducing metal complex is a complex of a reducing metal with an oxyacid.

3. A process according to claim 2, wherein the oxyacid is an acid selected from the group consisting of tartaric acid and citric acid.

4. A process according to claim 1, wherein the reducing metal complex is a complex of a reducing metal with a complexing agent selected from the group consisting of nitrilotriacetic acid and water-soluble salts thereof.

5. A process according to claim 1, wherein the reducing metal complex is a complex of a reducing metal with a complexing agent selected from the group consisting of succinic acid, oxalic acid, ammonium oxalate, acetylacetone, ethylenediaminetetraacetic acid and water-soluble salts of ethylenediaminetetraacetic acid.

6. A process according to claim 1, wherein the reducing metal complex is a complex of a ferrous ion and a complexing agent, said complexing agent being capable of forming with said ferrous ion a water soluble complex stable under the basicity of amine.

7. A process according to claim 1, wherein the reducing metal complex is a complex of a metal ion selected from the group consisting of Sn, Mn, Cu, Ni, Pb, Ag and Co and a complex agent, said complexing agent being capable of forming with said metal ion a water soluble complex stable under the basicity of amine.

8. A process for the stabilization of soil which comprises injecting into the soil a mixture comprising at least one water-soluble divinyl compound, at least one water-soluble vinyl compound copolymerizable therewith and a redox catalyst, and polymerizing and solidifying the mixture in the soil, characterized in that a catalytic amount of a mixture comprising 0.001—20 percent by weight of amine and about 0.01—20 percent by weight of a reducing metal ion and further 0.01—20 percent by weight of a complexing agent, all weights being based on the polymeric component, said complexing agent converting said metal ion to a complex which is water soluble and stable under the basicity of the amine.

9. A process according to claim 8, wherein the reducing metal ion is ferrous ion.

10. A process according to claim 8, wherein the reducing metal ion is a metal ion selected from the group consisting of Sn(II), Mn(II), Cu(II), Zn(II), Ni(II), Pb(II), Ag(I) and Co(II) ions.

11. A process according to claim 8, wherein the complexing agent is an oxyacid.

12. A process according to claim 11, wherein the oxyacid is selected from the group consisting of tartaric and citric acids.

13. A process according to claim 8, wherein the complexing agent is one member selected from the group consisting of nitrilotriacetic acid and water-soluble salts thereof.